(12) United States Patent
Vinogradov

(10) Patent No.: US 7,619,204 B2
(45) Date of Patent: Nov. 17, 2009

(54) IMAGING READER WITH ENHANCED LIGHT THROUGHPUT

(75) Inventor: Igor Vinogradov, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 12/005,578

(22) Filed: Dec. 27, 2007

(65) Prior Publication Data

US 2009/0166543 A1 Jul. 2, 2009

(51) Int. Cl.
G06K 7/10 (2006.01)
G06K 7/14 (2006.01)

(52) U.S. Cl. ............... 250/216; 235/462.35; 359/253

(58) Field of Classification Search ............ 250/208.1, 250/216; 359/665, 666; 235/462.35
See application file for complete search history.

(56) References Cited

U.S. PATENT DOCUMENTS

| | | | |
|---|---|---|---|
| 5,150,234 A * | 9/1992 | Takahashi et al. | 349/1 |
| 6,347,742 B2 * | 2/2002 | Winarski et al. | 235/462.35 |
| 6,437,925 B1 * | 8/2002 | Nishioka | 359/726 |
| 6,739,694 B2 | 5/2004 | Okamura et al. | |
| 6,769,763 B2 | 8/2004 | Kurata et al. | |
| 6,806,988 B2 | 10/2004 | Onuki et al. | |
| 6,859,333 B1 | 2/2005 | Ren et al. | |
| 6,929,356 B2 | 8/2005 | Hirano et al. | |
| 6,936,809 B2 * | 8/2005 | Viinikanoja | 250/216 |
| 6,991,325 B2 | 1/2006 | Oda et al. | |
| 7,264,162 B2 | 9/2007 | Barkan | |
| 2005/0199725 A1 * | 9/2005 | Craen et al. | 235/462.22 |
| 2006/0170739 A1 | 8/2006 | Koga et al. | |
| 2007/0063048 A1 * | 3/2007 | Havens et al. | 235/462.46 |

FOREIGN PATENT DOCUMENTS

| | | |
|---|---|---|
| JP | 2000277226 | 10/2000 |
| JP | 2000343722 | 12/2000 |
| JP | 2002190677 | 7/2002 |

OTHER PUBLICATIONS

U.S. Appl. No. 12/005,724, filed Dec. 29, 2006, Bro. Kogyo Kabushiki Kaisha.
U.S. Appl. No. 12/005,988, filed Dec. 28, 2007, Bro. Kogyo Kabushiki Kaisha.
U.S. Appl. No. 12/005,472, filed Dec. 27, 2007, Bro. Kogyo Kabushiki Kaisha.
International Search Report and the Written Opinion of the International Searching Authority for International Application PCT/US2008/086408 mailed Feb. 4, 2009.

* cited by examiner

Primary Examiner—Georgia Y Epps
Assistant Examiner—Tony Ko

(57) ABSTRACT

A solid-state imager detects return light from a target, and generates an electrical signal corresponding to the return light. A controller processes the electrical signal into data indicative of the target during an imaging mode of operation. An imaging lens assembly captures, optically modifies and directs the return light over a field of view along an optical path onto the imager. The imaging lens assembly includes a variable liquid lens controlled by the controller for optically modifying the return light. The liquid lens has an entrance area and is located in close proximity to an aperture stop A plurality of solid lenses magnifies the aperture stop and has an entrance pupil larger in size than the aperture stop and the entrance area to increase throughput of the return light to the imager.

23 Claims, 3 Drawing Sheets

IMAGING READER WITH ENHANCED LIGHT THROUGHPUT

DESCRIPTION OF THE RELATED ART

Solid-state imaging systems or imaging readers have been used to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes a solid-state imager or sensor having an array of cells or photosensors, which correspond to image elements or pixels in a field of view of the imager, and an imaging lens assembly for capturing return light scattered and/or reflected from the symbol being imaged. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

It is desirable that the symbol be capable of being read over an extended range of working distances relative to the imaging reader. It is conventional to move one or more lenses in the imaging lens assembly and, in turn, to move imaging planes at which the symbol is located between a near position close to the reader and a far position further away from the reader. The lens movement is typically performed mechanically. This is disadvantageous for several reasons. First, the mechanical movement generates vibrations that are propagated through the reader to a user's hand in a handheld mode of operation, and may also generate dust to obscure the imaging lens assembly. Moreover, the vibrations can generate objectionable, annoying, audible hum. In addition, the lens movement requires a drive that, in turn, consumes electrical power, is expensive and slow, can be unreliable, occupies space and increases the overall weight, size and complexity of the reader.

A liquid lens has been proposed to adjust the focus of an optical assembly. U.S. Pat. No. 5,305,731 describes a liquid lens with an adjustable focal length. U.S. Pat. No. 5,625,496 describes changing an index of refraction inside a liquid lens. French Patent Publication No. 2,791,439 and No. 2,769,375 (and its equivalent, U.S. Pat. No. 6,369,954) describe a variable focus liquid lens. A liquid lens based on an electro-wetting effect for use in electro-optical readers including imaging readers is described in U.S. Pat. No. 7,201,318 and U.S. Pat. No. 7,264,162 in which an electrical voltage is applied to the liquid lens to change an optical property, e.g., a focal length, thereof in accordance with a transfer function that resembles a parabola when a reciprocal of focal length is plotted against the applied voltage. U.S. Pat. No. 4,190,330, U.S. Pat. No. 5,305,731, and U.S. Pat. No. 6,859,333 achieve variable focusing using liquid crystal (LC) materials and cells of the type used in optical displays.

The liquid lens, as part of the imaging lens assembly, is therefore advantageous because its focal length can be adjusted electrically, and a lens is not mechanically moved. However, the liquid lens has a relatively small, entrance area for the admission of light therethrough. The entrance area is a usable part of the liquid lens that admits light of acceptable quality. The entrance area is quite limited in size, typically on the order of 2-3 mm diameter. The size of the entrance area determines the amount of light passing through the liquid lens, as part of the imaging lens assembly, and focused on the imager. Thus, the liquid lens limits the amount of light throughput and degrades the reading performance of the imaging reader to read symbols, especially at far working distances where the amount of available light is limited.

SUMMARY OF THE INVENTION

One feature of the present invention resides, briefly stated, in an arrangement for, and a method of, imaging a target, e.g., one- and/or two-dimensional symbols or like indicia to be electro-optically read, and non-symbols. The arrangement includes a solid-state imager or sensor that has an array of image sensors, e.g., a CCD or a CMOS array, for detecting return light from the target, and for generating an electrical signal corresponding to the return light, and a controller, typically a microprocessor, for processing the electrical signal into data indicative of the target during an imaging mode of operation.

The arrangement further includes an imaging lens assembly for capturing, optically modifying and directing the return light over a field of view along an optical path onto the imager. The imaging lens assembly includes a variable liquid lens controlled by the controller for optically modifying the return light. The liquid lens has an entrance area which, as described above, is relatively small and therefore limits the amount of return light passing therethrough to the imager.

This feature of the invention proposes locating the liquid lens in proximity to an aperture stop, and magnifying the aperture stop with a plurality of solid lenses. The imaging lens assembly has an entrance pupil substantially larger than the aperture stop and the entrance area, thereby increasing throughput of the return light to the imager. The entrance pupil is an image of the aperture stop as viewed from a front of the imaging lens assembly. Imaging performance of the imaging reader to read symbols is therefore enhanced, especially at far working distances where the amount of available light is limited.

In a preferred embodiment, the liquid lens has a pair of light-transmissive liquids arranged along the optical path. The liquids are immiscible, have different optical indices of refraction, and have a substantially same density. One of the liquids has a shape in a rest state for optically modifying the return light passing through the one liquid along the optical path from the indicia with a first optical characteristic. The controller is operative for applying a voltage across the one liquid to change the shape thereof for optically modifying the return light to have a different, second optical characteristic.

In another preferred embodiment, the liquid lens has a pair of light-transmissive, electrically conductive electrodes and a nematic liquid crystal (LC) layer having a changeable optical index of refraction between the electrodes. The controller is operative for applying a voltage across the electrodes to change the index of refraction of the LC layer, and for optically modifying the return light passing through the LC layer to have different optical characteristics.

It is advantageous if the liquid lens is located in close proximity with the aperture stop and preferably between the aperture stop and the imager, especially with the liquid lens in contact with the aperture stop. The plurality of the solid lenses is preferably configured as a triplet, especially a Cooke triplet, with the aperture stop preferably located between the triplet and the liquid lens. The triplet has a pair of lenses of positive optical power spaced apart along the optical path, and a lens of negative optical power located between the pair of lenses of positive optical power. Each solid lens is preferably constituted of a glass or a plastic material. At least one of the solid lenses has at least one aspherical surface. The triplet has an exit pupil at the aperture stop, and an entrance pupil larger in size than the entrance area of the liquid lens. The larger entrance pupil admits more of the return light than heretofore, thereby enhancing reader performance.

The method of imaging the target comprises the steps of: detecting return light from the target with a solid-state imager having an array of image sensors, and generating an electrical signal corresponding to the return light; processing the electrical signal into data indicative of the target during an imaging mode of operation; and capturing, optically modifying and directing the return light over a field of view along an optical path onto the imager, by controlling a variable liquid lens having an entrance area, by positioning an aperture stop in proximity to the liquid lens, and by magnifying the aperture stop with a plurality of solid lenses having an entrance pupil larger than the aperture stop and the entrance area to increase throughput of the return light to the imager.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
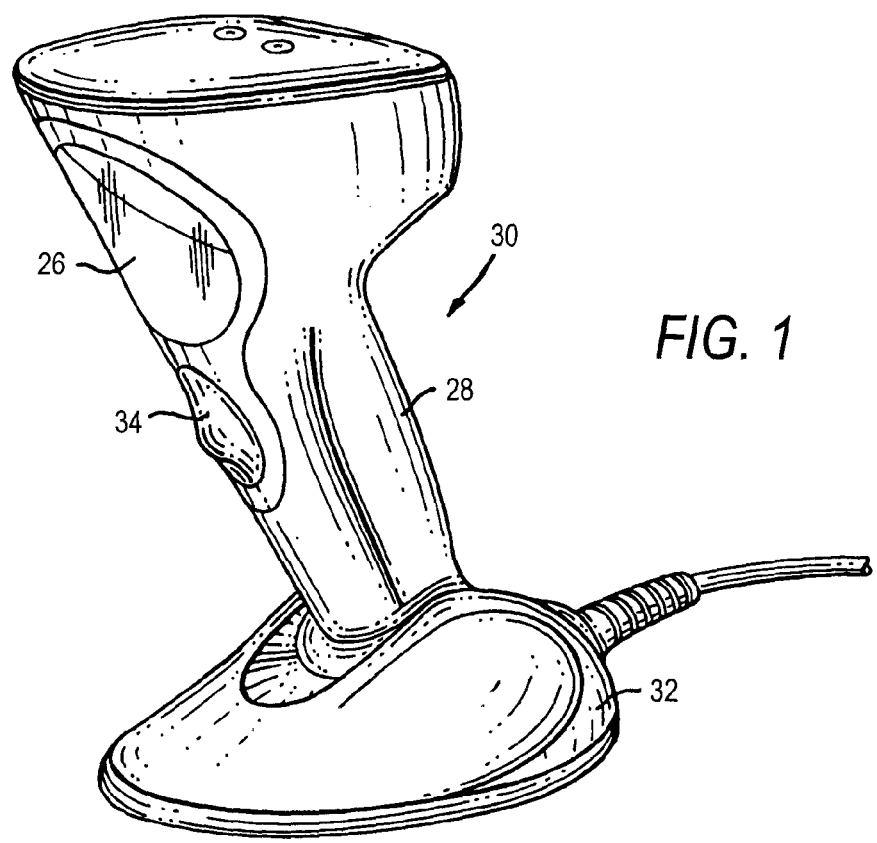
FIG. 1 is a perspective view of a portable imaging reader operative in either a handheld mode, or a hands-free mode, for capturing return light from indicia.

Reference numeral 30 in FIG. 1 generally identifies an imaging reader having a generally vertical window 26 and a gun-shaped housing 28 supported by a base 32 for supporting the imaging reader 30 on a countertop. The imaging reader 30 can thus be used in a hands-free mode as a stationary workstation in which products are slid, swiped past, or presented to, the vertical window 26, or can be picked up off the countertop and held in an operator's hand and used in a handheld mode in which a trigger 34 is manually depressed to initiate imaging of indicia to be read. In another variation, the base 32 can be omitted, and housings of other configurations can be employed.

Figure 2:
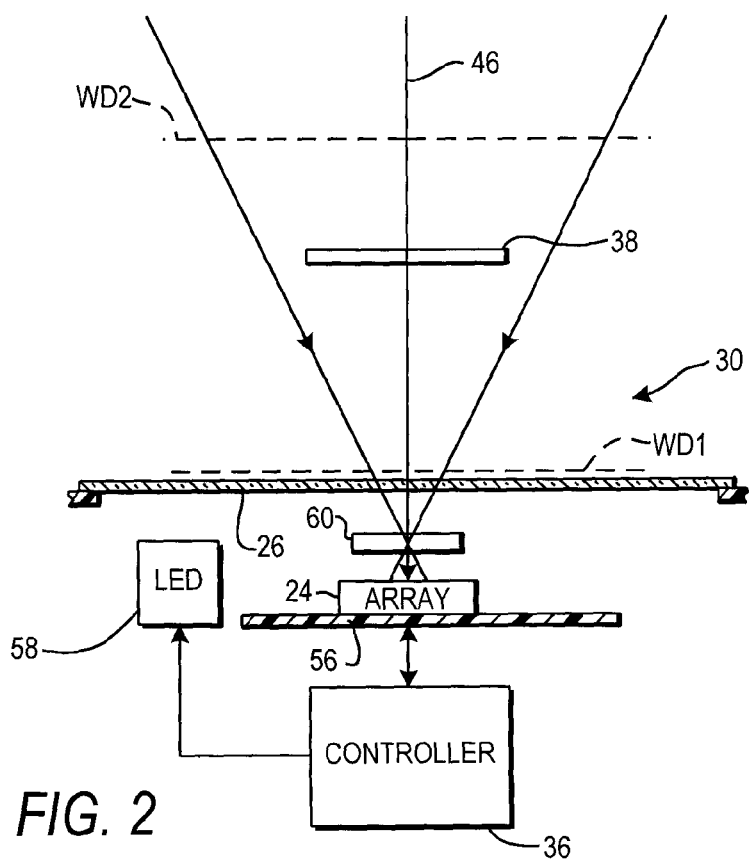
FIG. 2 is a schematic diagram of various components of the reader of FIG. 1.

As schematically shown in FIG. 2, an imager or sensor 24 is mounted on a printed circuit board 56 in the reader. The imager 24 is a solid-state device, for example, a CCD or a CMOS imager and has a one- or two-dimensional array of addressable image sensors operative for capturing return light captured and projected by an imaging lens assembly 60 through the window 26. The return light is scattered and/or reflected from a target 38, for example, a one- and/or two-dimensional symbol, or a non-symbol target, over a field of view. The non-symbol target can be virtually anything, such as a person, place, or thing whose picture is to be acquired. The targets are located anywhere in a working range of distances between a close-in working distance (WD1) and a far-out working distance (WD2). In a preferred embodiment, WD1 is about two inches from the imager array 24 and generally coincides with the window 26, and WD2 can be many feet from the window 26.

An illuminator is also mounted in the imaging reader and preferably includes one light source, e.g., a light emitting diode (LED) 58, or a plurality of light sources arranged to uniformly illuminate the target. As shown in FIG. 2, the imager 24 and the illuminator LED 58 are operatively connected to a controller or microprocessor 36 operative for controlling the operation of these components. Preferably, the microprocessor is the same as the one used for processing the return light from the symbols and for decoding the captured target images.

In operation, the microprocessor 36 sends a command signal to pulse the illuminator LED 58 for a short time period, say 500 microseconds or less, and energizes and exposes the imager 24 to collect light from a target only during said time period. A typical array needs about 33 milliseconds to acquire the entire target image and operates at a frame rate of about 30 frames per second. The array may have on the order of one million addressable image sensors.

Figure 4:
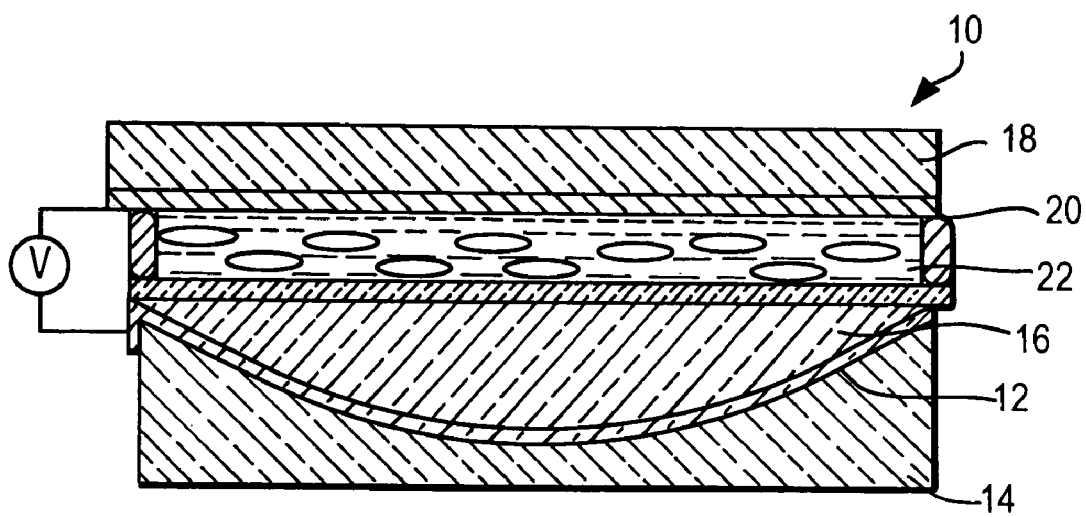
FIG. 4 is an enlarged, sectional view of a variable liquid imaging lens of the liquid crystal type used in the reader of FIG. 1.
Figure 5:
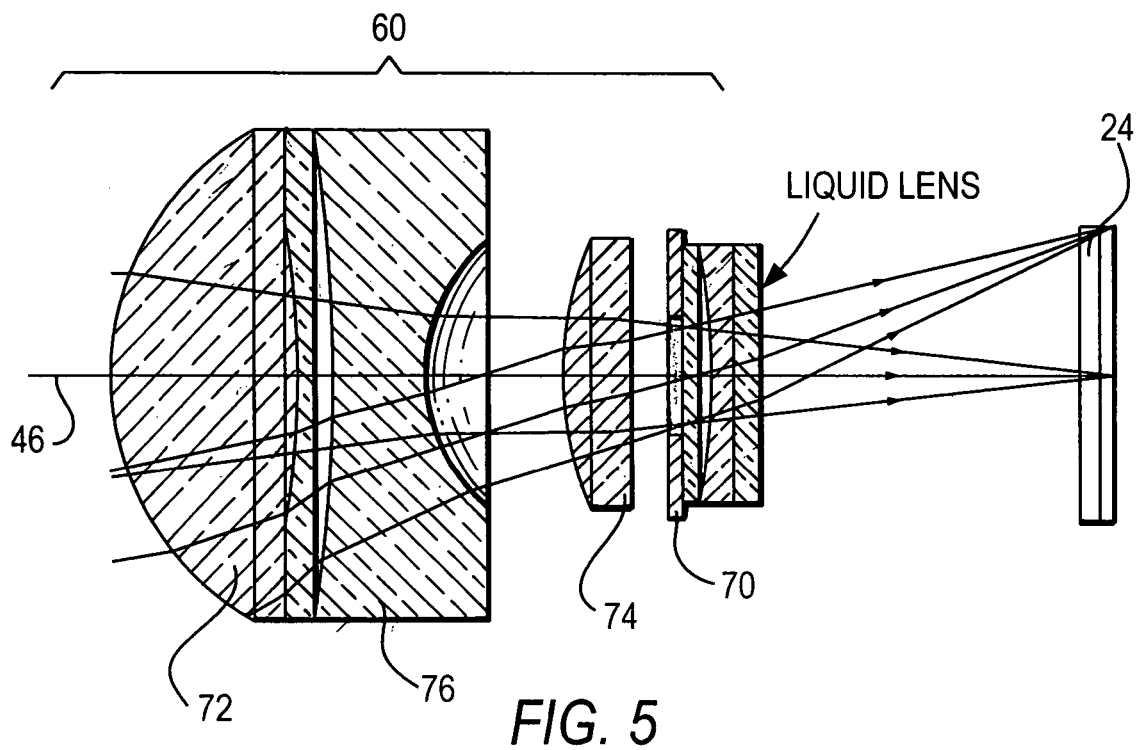
FIG. 5 is a side view of an imaging lens assembly employing either the liquid lens of FIG. 3 or FIG. 4 for use with the reader of FIG. 1 during capture of the return light in an imaging mode of operation.
Figure 6:
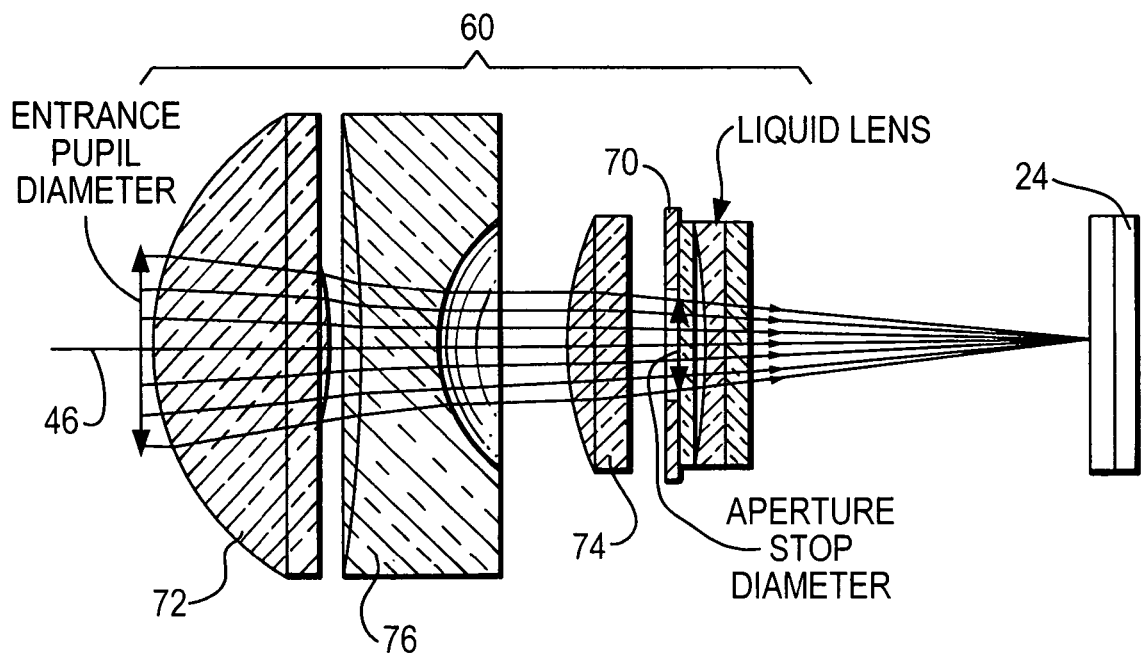
FIG. 6 is an exploded view of the imaging lens assembly of FIG. 5 showing an entrance pupil of the assembly larger than an aperture stop and an entrance area of the liquid lens in accordance with a magnifying effect by a plurality of solid lenses.

As best seen in FIG. 5 or FIG. 6, the imaging lens assembly 60 includes a variable liquid imaging lens. The liquid lens may be of the electro-wetting type 35 as shown in FIG. 3, or of the liquid crystal type 10 as shown in FIG. 4.

Figure 3:
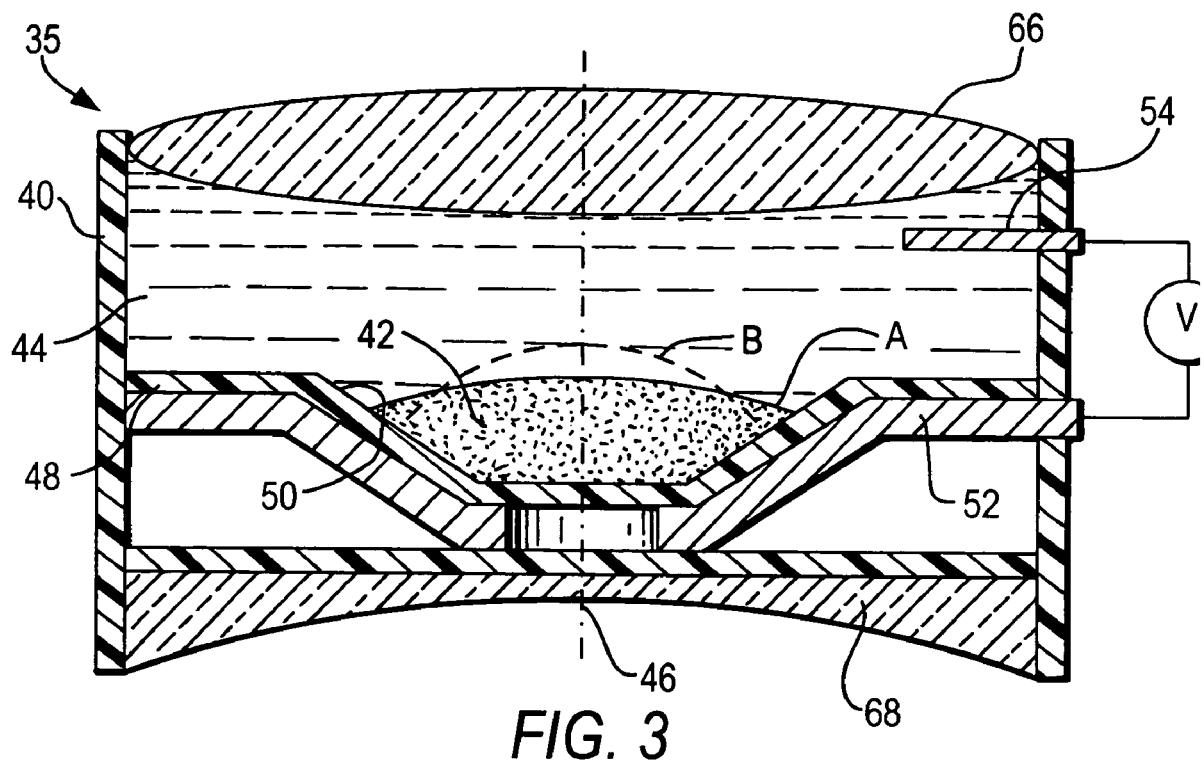
FIG. 3 is an enlarged, sectional view of a variable liquid imaging lens of the electro-wetting type used in the reader of FIG. 1.

The electro-wetting liquid lens 35 of FIG. 3 has a housing 40 in which a first liquid 42, shown in droplet form, and a second liquid 44 are arranged along an optical path 46 that extends toward an indicia such as the indicia or symbol 38 to be read. The liquids 42, 44 are light-transmissive, immiscible, of different optical indices of refraction, and of a substantially same density. The liquid or drop 42 is constituted of an electrically insulating substance. For example, an oil, an alcane, or a blend of alcanes, preferably halogenated, or any other insulating liquid may be used for the drop 42. The liquid 44 is constituted of an electrically conductive substance, for example, water loaded with salts (mineral or other), or any other liquid, organic or not, and preferably made conductive by the addition of ionic components.

The housing 40 is constituted of an electrically insulating, light-transmissive, material, such as glass, preferably treated with silane or coated with a fluorinated polymer, or a laminate of fluorinated polymer, epoxy resin and polyethylene. The housing 40 includes a dielectric wall 48, preferably having a well 50 in which the drop 42 is accommodated in symmetrical relation relative to the optical path or axis 46. The wall 48 normally has a low wetting characteristic compared to the drop 42, but a surface treatment insures a high wetting characteristic and maintains a centered position of the drop 42 and prevents the drop from spreading. The well 50 further helps to prevent such spreading.

A first electrode 54 extends into the liquid 44, and a second electrode 52 is located below the wall 52. The electrodes are connected to a voltage source V. The electrodes, especially electrode 52, are preferably light-transmissive. When a voltage is applied across the electrodes, an electrical field is created which alters the wetting characteristic of the wall 48 with respect to the drop 42. The wetting increases substantially in the presence of an electrical field. With no voltage applied, the drop 42 takes the generally hemispherical shape in a rest state shown in solid lines in FIG. 3, and its outer surface "A" is convex. When a voltage is applied, the wetting of the dielectric wall 48 increases, and the drop 42 deforms and takes the shape shown in dashed lines in FIG. 3, and its outer surface "B" is more convex with a smaller radius of curvature. This deformation of the drop changes the focus of the lens 35 and is employed to adjust the focal length of the assembly 60 to collect the return light from the target 38 over a range of working distances.

By way of example, the drop 42 in the rest state has a diameter of about 6 mm. If the liquid 44 is salt water, its index of refraction is about 1.35. If the drop 42 is oil, its index of refraction is about 1.45. About 40 diopters of focus variation can be achieved for an applied voltage of about 40v RMS. The response time of the liquid lens is several hundredths of a second, in which case, if a periodic voltage is used, the frequency can be between 50 Hz and 10 kHz so that its period is smaller than the response time.

The liquid lens 35 may also have a fixed convex lens 66 at one axial end region, and a fixed concave, or plano-concave, lens 68 at the opposite axial end region. These fixed lenses may be part of the overall imaging lens assembly and assist in minimizing any kind of aberrations, for example, chromatic aberrations.

As described so far, the change in curvature of the drop 42 is between two convex curvatures A, B. It is also within the spirit of this invention to deform the drop 42 between different curvatures. For example, it is possible that the outer surface of the drop could be a meniscus, that is concave in the rest state, generally flat to focus the light at a first focal plane when a first voltage is applied, and convex to focus the light at a second focal plane when a second, different voltage is applied.

The variable liquid crystal (LC) lens 10 of FIG. 4 has a first, glass or polymer, substrate having a lower portion 14 with a concave surface, an upper portion 16 with a convex surface of complementary contour to the concave surface, and a curved, optically transparent, electrically conductive, electrode 12 made from a material such as indium-tin-oxide between the upper and lower portions of the substrate. The LC lens 10 also has a second, glass or polymer, generally planar substrate 18 having a surface coated with a generally planar, optically transparent, electrically conductive, electrode 20. The two substrates 13 and 14 face an LC layer or cell 22, and are coated with alignment layers (not shown). Alignment layers are used on the opposing surfaces of the substrates adjacent to the LC layer to produce a homogeneous alignment. Persons skilled in the art may select from a wide variety of materials, usually polyimides, including, but not limited to, polyvinyl alcohol (PVA) for use as alignment layers on the substrates. The LC layer is injected into the cell.

The LC layer 22 has at least one semi-ordered, mesomorphic or nematic phase, in addition to a solid phase and an isotropic liquid phase. Molecules of the nematic LC layer typically are rod-shaped with the average direction of the long axes of the rod-shaped molecules being designated as the director, or may be disk-shaped with the direction perpendicular to the disk-shaped molecules being designated as the director. The nematic phase is characterized in that the directors are aligned in a preferred direction.

Birefringence in nematic LC materials is most readily described in terms of a splitting of incoming light entering the LC layer into two perpendicularly polarized rays called the ordinary ray and the extraordinary ray. A variation in a refractive index of the LC layer 22 with respect to the extraordinary ray is effected by varying the angle between the directors relative to the direction of the incoming light. Such tilting of the directors in the LC layer is produced by varying the strength of an electric or magnetic field across the LC layer 22. The directors typically tend to align themselves generally parallel to the direction of the electric or magnetic field. There is a threshold field strength below which the directors do not appreciably respond to the applied field and above which they respond monotonically as the field strength increases until realignment in response to the field reaches saturation.

The refractive index of the LC layer 22 changes in response to a change of field strength to produce a variation of optical properties, e.g., focal length, in the imaging lens assembly 60 in the imaging reader. When a voltage V is applied across the electrodes 12, 20, the electric field will produce a centro-symmetrical gradient distribution of refractive index within the LC layer 22. The LC layer 22 causes light to be modified, e.g., focused, when a suitable voltage is applied across the electrodes.

The voltage for either liquid lens is preferably periodic, preferably a square wave drive voltage. The square wave is easily created with a variable duty cycle by the microprocessor 36 having a built-in pulse width modulator circuit. The drive voltage could also be sinusoidal or a triangular wave signal, in which case, the amplitude of the voltage controls the shape of the drop 42 or the refractive index of the LC layer 22 and, in turn, the focal length and the working distance. When a square wave is used, focal length changes are achieved by varying the duty cycle. When a sinusoidal wave is used, focal length changes are obtained by varying the drive voltage amplitude. The amplitude or the duty cycle can be changed in discrete steps (digital manner) or continuously (analog manner) by the microprocessor or controller 36. The voltage could also be a constant DC voltage.

The controller 36 may operate to apply the voltage to either liquid lens at all times, or at selected times. Thus, the voltage can be applied for each read, or for every other read, etc. The voltage can be applied not only during reading, but even afterward. The voltage can be initiated at the pull of the trigger 34, or only after a symbol has been detected. The voltage can be applied automatically, or only after a signal analyzer, preferably another microprocessor, has determined that the symbol has not yet been successfully decoded and read.

It will be seen that the change in focus is accomplished without mechanical motion of any solid lenses. Except for the liquids, all parts of the variable liquid lens can be made of molded materials. However, as noted above, the liquid lens has a relatively small, entrance area for the admission of light therethrough. The diameter of the entrance area is quite limited, typically on the order of 2-3 mm. The size of the entrance area determines the amount of light passing through the liquid lens, as part of the imaging lens assembly 60, and focused on the imager 24. Thus, the liquid lens limits the amount of light throughput and degrades the performance of the imaging reader to image targets, especially at far working distances where the amount of available light is limited.

In accordance with one aspect of this invention, the imaging lens assembly 60 comprises a plurality of solid lenses 72, 74, 76 and an aperture stop 70, together with the aforementioned liquid lens. The liquid lens is placed in proximity to the aperture stop 70, preferably downstream of the solid lenses between the aperture stop 70 and the imager 24, especially with the liquid lens in contact with the aperture stop 70. The plurality of the solid lenses, also called a base lens, is preferably configured as a triplet, especially a Cooke triplet, with the aperture stop 70 located between the triplet and the liquid lens. The lenses 72, 74 have a positive optical power and are spaced apart along the optical path 46. The lens 76 has a negative optical power and is located between the lenses 72, 74. Each solid lens 72, 74, 76 is preferably constituted of a glass or a plastic material. It is especially preferred if the lenses 72, 74 are made from crown glass and have a high Abbe value, and if the lens 76 is made from flint glass and has a low Abbe value. At least one, if not all, of the solid lenses has at least one aspherical surface.

The aperture stop 70 is located at the exit pupil of the triplet. As best seen in FIG. 6, the triplet has an entrance pupil larger in diameter than the diameter of the aperture stop, i.e., the diameter of the entrance area of the liquid lens. The triplet magnifies the aperture stop 70. Magnification on the order of 1.3 times the aperture stop diameter is sufficient to improve reading performance. In a preferred embodiment, the magnification is on the order of two times the aperture stop diameter. The larger entrance pupil of the assembly improves the throughput of the return light to the imager, as well as the signal-to-noise ratio. The resolution of the assembly is improved since the numerical aperture is larger, and the diffraction spot is smaller. Imaging performance of the imaging reader to read symbols is therefore enhanced, especially at far working distances, even on the order of several hundred feet from the reader, where the amount of available light is limited.

It will be understood that each of the elements described above, or two or more together, also may find a useful application in other types of constructions differing from the types described above. For example, more or less than the three solid lenses can be employed. Additional lenses can be added between the liquid lens and the imager 24 to minimize field curvature.

While the invention has been illustrated and described as an imaging reader with enhanced light throughput, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for imaging a target, comprising:
   a solid-state imager having an array of image sensors for detecting return light from the target, and for generating an electrical signal corresponding to the return light;
   a controller for processing the electrical signal into data indicative of the target during an imaging mode of operation; and
   an imaging lens assembly for capturing, optically modifying and directing the return light over a field of view along an optical path onto the imager, the imaging lens assembly including a variable liquid lens controlled by the controller for optically modifying the return light and having an entrance area, an aperture stop in proximity to the liquid lens, and a plurality of solid lenses upstream along the optical path away from the aperture stop, for magnifying the aperture stop and having an entrance pupil larger than the aperture stop and the entrance area to increase throughput of the return light to the imager.

2. The arrangement of claim 1, wherein the liquid lens has a pair of light-transmissive liquids arranged along the optical path, the liquids being immiscible, of different optical indices of refraction, and of a substantially same density, one of the liquids having a shape in a rest state for optically modifying the return light passing through said one liquid along the optical path from the indicia with a first optical characteristic; and wherein the controller is operative for applying a voltage across said one liquid to change the shape thereof for optically modifying the return light to have a different, second optical characteristic.

3. The arrangement of claim 1, wherein the liquid lens has a pair of light-transmissive, electrically conductive electrodes and a nematic liquid crystal (LC) layer having a changeable optical index of refraction between the electrodes; and wherein the controller is operative for applying a voltage across the electrodes to change the index of refraction of the LC layer, and for optically modifying the return light passing through the LC layer to have different optical characteristics.

4. The arrangement of claim 1, wherein the liquid lens is in close proximity to the aperture stop and is located between the aperture stop and the imager.

5. The arrangement of claim 1, wherein the liquid lens is in contact with the aperture stop.

6. The arrangement of claim 1, wherein the plurality of the solid lenses constitutes a triplet, and wherein the aperture stop is located between the triplet and the liquid lens.

7. The arrangement of claim 6, wherein the triplet is operative for magnifying the aperture stop so that the entrance pupil is at least 1.3 times larger in size than the aperture stop and the entrance area of the liquid lens.

8. The arrangement of claim 6, wherein the triplet has an exit pupil at the aperture stop.

9. The arrangement of claim 6, wherein the triplet has a pair of lenses of positive optical power spaced apart along the optical path, and a lens of negative optical power located between the pair of lenses of positive optical power.

10. The arrangement of claim 1, wherein each solid lens is constituted of one of a glass or plastic material.

11. The arrangement of claim 1, wherein one of the solid lenses has an aspherical surface.

12. An arrangement for imaging a target, comprising:
    imaging means for detecting return light from the target, and for generating an electrical signal corresponding to the return light;
    control means for processing the electrical signal into data indicative of the target during an imaging mode of operation; and
    capture means for capturing, optically modifying and directing the return light over a field of view along an optical path onto the imaging means, the capture means including a variable liquid means controlled by the control means for optically modifying the return light and having an entrance area, a stop means in proximity to the liquid means, and optical means upstream along the optical path away from the stop means, for magnifying the stop means and having an entrance pupil larger than the stop means and the entrance area to increase throughput of the return light to the imaging means.

13. A method of imaging a target, comprising the steps of:
detecting return light from the target with a solid-state imager having an array of image sensors, and generating an electrical signal corresponding to the return light;
processing the electrical signal into data indicative of the target during an imaging mode of operation; and
capturing, optically modifying and directing the return light over a field of view along an optical path onto the imager, by controlling a variable liquid lens having an entrance area, by positioning an aperture stop in proximity to the liquid lens, and by magnifying the aperture stop with a plurality of solid lenses upstream along the optical path away from the aperture stop, and having an entrance pupil larger than the aperture stop and the entrance area to increase throughput of the return light to the imager.

14. The method of claim 13, and arranging a pair of light-transmissive liquids along the optical path, and configuring the liquids to be immiscible, of different optical indices of refraction, and of a substantially same density, and optically modifying the return light passing through one of the liquids along the optical path from the indicia with a first optical characteristic; and applying a voltage across said one liquid to change a shape thereof in a rest state to optically modify the return light to have a different, second optical characteristic.

15. The method of claim 13, and arranging a pair of light-transmissive, electrically conductive electrodes along the optical path, and positioning a nematic liquid crystal (LC) layer having a changeable optical index of refraction between the electrodes; and applying a voltage across the electrodes to change the index of refraction of the LC layer, to optically modify the return light passing through the LC layer to have different optical characteristics.

16. The method of claim 13, and locating the liquid lens in close proximity to the aperture stop and between the aperture stop and the imager.

17. The method of claim 13, and contacting the liquid lens with the aperture stop.

18. The method of claim 13, and configuring the plurality of the solid lenses as a triplet, and locating the aperture stop between the triplet and the liquid lens.

19. The method of claim 18, and magnifying the aperture stop so that the entrance pupil is at least 1.3 times larger in size than the aperture stop and the entrance area of the liquid lens.

20. The method of claim 18, and configuring the triplet with an exit pupil at the aperture stop.

21. The method of claim 18, and configuring the triplet with a pair of lenses of positive optical power spaced apart along the optical path, and with a lens of negative optical power located between the pair of lenses of positive optical power.

22. The method of claim 13, and constituting each solid lens of one of a glass or plastic material.

23. The method of claim 13, and forming one of the solid lenses with an aspherical surface.

* * * * *